United States Patent
Poivre et al.

(10) Patent No.: US 6,223,241 B1
(45) Date of Patent: Apr. 24, 2001

(54) SHARING OF THE INDIRECT ADDRESSING OF THE REGISTERS OF A PERIPHERAL DEDICATED TO EMULATION

(75) Inventors: Gregory Poivre; Jean-Hugues Bosset, both of Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/212,800

(22) Filed: Dec. 16, 1998

(30) Foreign Application Priority Data

Dec. 19, 1997 (FR) .................................................. 97 16196

(51) Int. Cl.⁷ .............................. G06F 9/455; G06F 13/40
(52) U.S. Cl. .......................... 710/130; 710/129; 712/228; 703/24; 703/25
(58) Field of Search .................... 703/23, 21, 24, 703/26, 27, 22; 710/129, 130; 338/1.13; 709/20; 712/234, 218, 13, 32, 22, 222, 7, 229, 228

(56) References Cited

U.S. PATENT DOCUMENTS

| | | | |
|---|---|---|---|
| 5,537,562 | * | 7/1996 | Gallup et al. ........................ 712/234 |
| 5,867,649 | * | 2/1999 | Larson ................................. 709/201 |
| 5,898,859 | * | 4/1999 | Kardach et al. ....................... 703/23 |

OTHER PUBLICATIONS

""Shadow" *Diagnostic Register for Gate Array Circuit Testing*," IBM Technical Disclosure Bulletin, vol. 30, No. 9, Feb. 1988, pp. 187–188.
J. Altenburg, "*Applikationen Mit Dem CMOS–Micro–Controller ST6 Teil 1*," Radio Fernsehen Elektronik, vol. 43, No. 2, Feb. 1, 1994, pp. 47–50.
T. Barron, "*Protected–Mode Debugging Using In–Circuit Emulators*," Dr. Dobb's Journal, Feb. 1992, USA, vol. 17, No. 2, pp. 46, 48, 50, 52–53, 55–56, 58.

* cited by examiner

Primary Examiner—Daniel H. Pan
(74) Attorney, Agent, or Firm—Theodore E. Galanthay; Allen, Dyer, Doppelt, Milbrath & Gilchrist, P.A.

(57) ABSTRACT

The microcontroller accesses a battery of hidden registers used essentially in the field of emulation. The fact that there is a large number of hidden registers means that it is not possible to assign them an address by which they can be accessed directly. Since this battery of hidden registers has to be accessible by a host circuit and by a microprocessor, recourse is had to a method of indirect addressing by means of two peripheral control registers. A priority signal obliges the microprocessor to wait for the read and write resources to be released by the host circuit to perform these instructions.

30 Claims, 2 Drawing Sheets

SHARING OF THE INDIRECT ADDRESSING OF THE REGISTERS OF A PERIPHERAL DEDICATED TO EMULATION

FIELD OF THE INVENTION

The present invention is directed to the area of microcontrollers, and, more particularly, to a microcontroller including a battery of hidden registers.

BACKGROUND OF THE INVENTION

A microcontroller is a circuit comprising essentially, on one and the same integrated circuit, a microprocessor also called a central processing unit, and a program memory. This program memory is specific to each microprocessor. It contains a set of instructions that must be adapted to a specified program, that is, an application that the microcontroller must execute. These sets of instructions may be efficient in varying degrees. Consequently, the programs are also important in varying degrees depending on the application for which they are designed.

Furthermore, these applications are numerous and varied. They are found in compatible type microcomputers, for example, for the control of hard disks. They may also be found in applications related to the control of any device, such as, for example, for flasher lights in the field of automobiles.

During the phase for the setting of the control program, the microcontroller is linked to a host circuit. This connection falls within the framework of the monitoring of the functioning of the microcontroller. In this context, it should be possible to read the electrical states of the microcontroller at certain steps and especially those steps where an operating defect is noted. It should also be possible to set the operation of the microcontroller and, in this case, the host circuit will write states in certain registers of the microcontroller.

These read and write operations between the registers of the microcontroller and the host circuit are achieved by means of an interface. More generally, this interface is used to exchange information elements with the outside world. These information elements are essentially data elements to be received and commands to be sent corresponding to the future use of the microcontroller.

To this end, the interface comprises a control bus and, more generally, two data and address exchange registers. Indeed, the number of exchange registers is generally small because, for reasons of cost, it is accepted that the structure of exchange with the external world will be reduced to the strict minimum. This makes the use of the microcontroller more tedious, especially during the stage for the setting of the control program.

The places in the memory of the microcontroller where it is necessary to read or write are varied. The term "memory" of the microcontroller may designate the memory proper, but may also designate operating registers of the microcontroller. Thus, this memory may be a program memory, namely the place in which the instructions to be executed in the microprocessor are stored. It may also be a data memory in which there are stored measured data elements of the controlled parameters of the microcontroller.

Finally, this memory may represent a set of parameter-setting registers or registers for the operation of the microcontroller, in particular, a batch of registers for setting the parameters of its peripherals. These registers are called special function registers (SFR). They are peripheral control registers that are indispensable for setting the parameters of these peripherals. The interface itself, owing to the different protocols that it is liable to accept, must have its parameters set by states stored in these registers. Other peripherals, like internal counters or clock frequency registers, are controlled by such registers.

In the context of emulation, a number of registers are used to program the different parts of a peripheral dedicated to emulation, known as an "on-chip emulator". This peripheral will hereinafter be called an OCE. To control the working of the microcontroller, a host circuit external to the microcontroller must be capable of accessing these registers, thereby enabling the programming of the different parts of the OCE. The central processing unit of the microcontroller, for its part, must also be capable of accessing these registers. It is therefore necessary that these registers should have an address in the memory space of the microprocessor.

The addressing space of the microcontroller is represented by the length of an address word that can be conveyed on the address bus of the microcontroller. This addressing space, according to its definition, is limited. However, in the framework of emulation, the number of operations to be controlled is becoming ever greater. These controls are obtained by means of registers. In these registers, certain electrical states of the microcontroller are copied, or their contents are compared with other electrical states of the microcontroller. Consequently, the number of monitoring registers needed, especially during emulation, becomes great. Some of these registers, and even many of them, therefore, cannot be addressed directly. Indeed, it is not possible to associate, with each of them, an address corresponding to an SFR, namely a peripheral control register, that would enable these supplementary registers to be accessed directly.

SUMMARY OF THE INVENTION

In view of the foregoing background, it is an object of the invention to resolve this problem of access to these hidden registers. In the invention, an indirect addressing is provided. An address bus, a data bus, and a control bus coming either from the host circuit or from the central processing unit of the microprocessor, switches over to the supplementary emulation monitoring registers or towards the normal memory, as the case may be. The invention includes the sharing of the indirect addressing mechanism developed for access to the host circuit with the central processing unit of the microcontroller.

To do this, the invention allocates two SFR addresses to the registers that can be accessed by the host circuit. These two SFRs can also be accessed by the central processing unit. A priority between these two possible accesses is envisaged. One of the two SFRs allocated will contain the address of the supplementary register to be accessed. The other allocated SFR will contain the data element read in one of the additional registers if the system is in the read mode. If the system is in the write mode, it will contain the data element to be written in the supplementary register, and whose address will be read in the first reserved SFR.

This battery of supplementary registers for use in the field of emulation thus makes it possible to release SFRs that were hitherto occupied. Thus, certain SFRs are now vacant. The invention proposes the copying into these vacant registers, of the contents of those supplementary registers dedicated to emulation that are most often used by the host circuit or by the central processing unit of the microcontroller.

An object of the invention therefore is a microcontroller comprising a central processing unit, and initial peripheral control registers that are limited in number owing to their addressing means. The microcontroller comprises hidden supplementary registers being accessible by means of a first peripheral control register and a second peripheral control register. The first access register is for an indirect addressing of the address of any one hidden supplementary register. The second access register is for an indirect addressing of a data element to be recorded or written in this hidden supplementary register. These additional registers are designed for use essentially in emulation. In a preferred application of the invention, they govern a peripheral designed for emulation.

BRIEF DESCRIPTION OF THE DRAWINGS

The invention will be understood more clearly from the following description and from the appended figures. These figures are given purely by way of an indication aid in no way limit the scope of the invention.

DETAILED DESCRIPTION OF THE PREFERRED EMBODIMENTS

Figure 1:
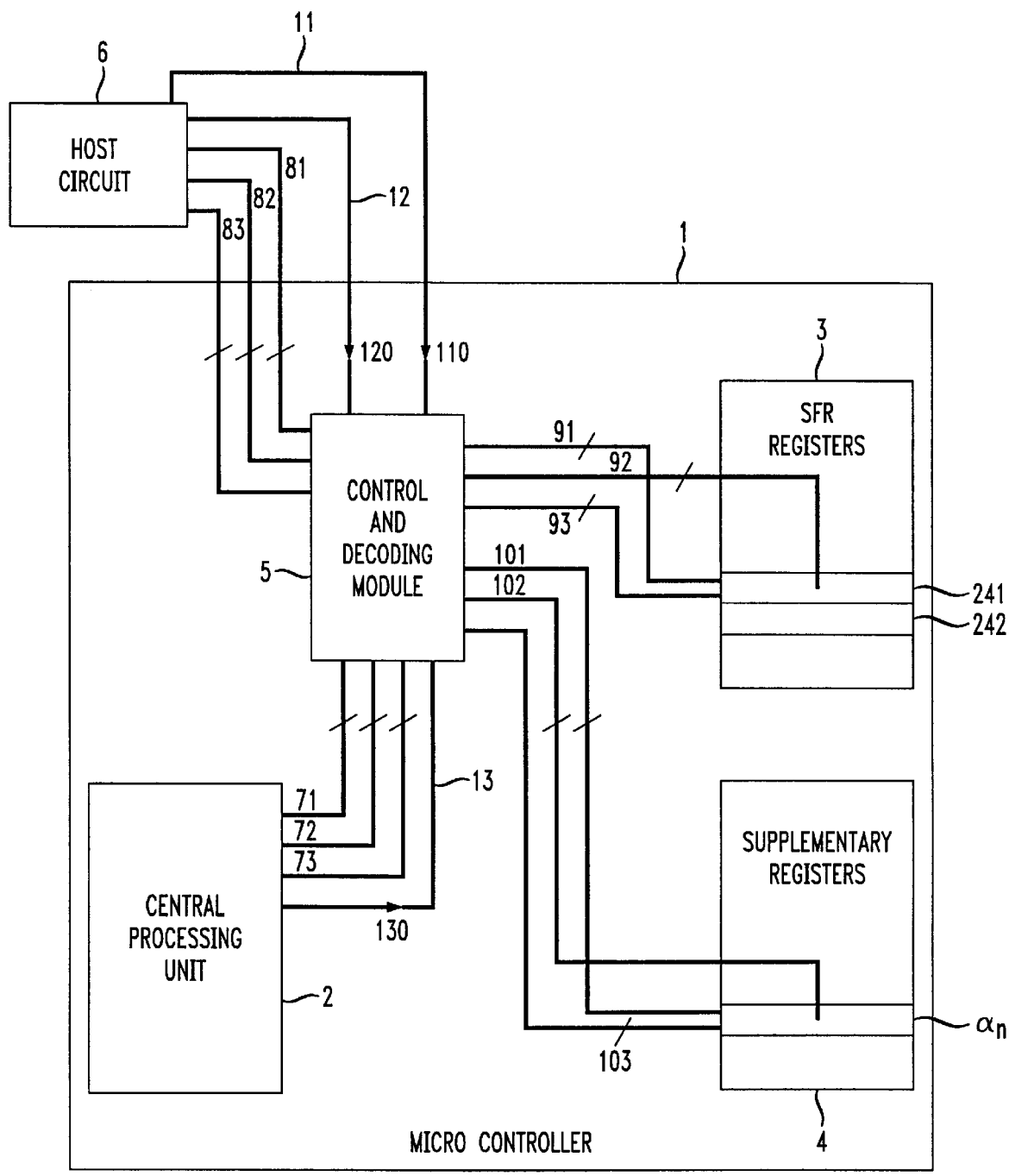
FIG. 1 shows a schematic view of a mechanism of access by the central processing unit of the microcontroller or by a host circuit external to this microcontroller to the hidden supplementary registers, this access being achieved by means of two reserved SFRs that can be accessed by the central processing unit of the microprocessor and by the external host circuit in accordance with the invention.

FIG. 1 shows a microcontroller 1 comprising a central processing unit 2, a battery of peripheral control registers 3 which shall hereinafter be called SFR registers, and a second battery of supplementary registers 4 which shall hereinafter be called hidden registers. The microcontroller also has a control and decoding module 5 and, outside this microcontroller, there is a host circuit 6.

With a view to simplification and clarity, the interface between the host circuit and the microcontroller mentioned above has not been shown. For the same reasons, the set of memories of the microcontroller has been reduced, in FIG. 1, to the SFR registers alone. The host circuit is connected to the control and decoding module by means of three buses which are a first address bus 81, a first data bus 82 and a first control bus 83.

The control module also receives three other buses coming from the central processing unit of the microcontroller. These buses are a second address bus 71, a second data bus 72 and a second control bus 73. At the output of this decoding module, there are six buses: a third address bus 91, a third data bus 92, and a third control bus 93 that enable read and write access to the first SFR registers. The other three buses at output of the decoding module are a fourth address bus 101, a fourth data bus 102, and a fourth control bus 103 that enable read and write access to the supplementary battery of hidden registers 4.

The control and decoding module 5 is a circuit based on elementary logic gates and multiplexers. It makes possible, as shall be seen hereinafter, control of the switch-over to the battery of registers SFR 3 or to the battery of supplementary registers 4. It also makes possible selection of the signals that have to be considered, i.e., it makes it possible the decision whether it is the signals coming from the host circuit 6 or those coming from the central processing unit 2 that must be taken into account.

Access in the read mode to one of the supplementary hidden registers takes place as follows. Let it be assumed that it is sought to read the contents of one of the supplementary hidden address registers an from the host circuit. On this assumption, the first address bus 81 conveys the address of a first reserve SFR register, typically the register 241. On the first data bus 82, the data element an is conveyed. This data element an is none other than the address of the hidden register to be read. The first control bus 83 conveys a control signal that enables the data element an to be written in the reserved SFR register 241. These information elements are conveyed to the control and decoding module 5. They can also be conveyed by the second data and control address buses, respectively 71, 72 and 73, coming from the central processing unit 2 if the read access has been achieved by the central processing unit 2.

The control and decoding module 5 receives a priority signal 110 by means of a link 11 coming from the host circuit. If this signal is active, the control and decoding module 5 gives priority to the signals coming from the buses connected to the host circuit 6. If this priority signal 110 is inactive, it is the signals conveyed by buses coming from the central processing unit 2 that are selected by the control module 5. Depending on the priority signal 110, at the third address bus 91, there is therefore found the address conveyed by the first address bus 81 or by the second address bus 71. Similarly, depending on this priority signal 110, the third data bus 92 conveys the data element conveyed by the first data bus 82 or by the second data bus 72. The third control bus 93 too, depending on the priority signal 110, conveys the command carried by the first control bus 83 or by the second control bus 73.

A first read mode step, therefore, includes writing, in the reserved SFR register 241, of a data element an, which is the address of the supplementary hidden register to be read.

Hereinafter, to clarify the explanations, we shall focus on the case where the reading of the data element contained in the supplementary hidden register an must be done by the host circuit 6. Under these conditions, in a second step of the read mode, the data element an which has been written in the SFR register 241 is read. A first switch-over signal 120 carried by a link 12 connecting the host circuit 6 and the control and decoding module 5 makes it possible to switch over the address, data and control information received by the control and decoding circuit 5 to the battery of hidden supplementary registers 4.

Thus, in a third step, the data element an that has been read in the address register SFR 241 is now conveyed by the first address bus 81 and then by the fourth address bus 101 after passage through the control and decoding module 5. The first control bus 83, whose instruction is at the fourth control bus 103 after passage through the control module 5, conveys a read instruction. The data element contained in the register an is thus read. This data element data an is conveyed to the host circuit 6 by the two-way data bus 102 and 82.

In a final step, after another operation to switch over the control module, the data element data an is conveyed by the data bus 82 to a second reserved SFR bus 242 whose address is conveyed first of all by the first address bus 81 and then by the third address bus 91. This data element is written in the second reserved register 242 according to the write instruction conveyed by the first control bus 83 and then by the third control bus 93. The content of the hidden register whose address is an, is thus available in the second reserved SFR register 242. This content is thus directly available either to the host circuit or to the central processing unit.

For a read operation performed by the central processing unit 2, the procedure is similar. The role of the first address, data and control buses, 81, 82 and 83 respectively, is fulfilled by the second address, data and control buses, respectively 91, 92 and 93. A second switch-over signal 130 is carried by a link 13 connecting the central processing unit and the control and decoding module 5. The signal 130 also enables the address, data and control information received by the control and decoding circuit 5 to be switched over to the battery of hidden supplementary registers 4.

Let us now look at the write mode. If it should be desired to write a data element in a hidden supplementary register whose address is an from the host circuit, the different steps of the write operation are as follows. Initially, the data element an, corresponding to the address of the hidden supplementary register in which it is sought to write, is conveyed by the first data bus 82. Then, after passing through the control module 5, by the third data bus 92, to the address 241 it is conveyed by the first address bus 81 and then by the third address bus 91. The first control bus 83 and then the third control bus 93 convey a write instruction.

In the same way, the data element data an to be written in the hidden register an is written in the second reserved SRF register 242. After the switch-over of the control circuit 5 according to the instruction conveyed by the first switch-over signal 120, the data element data an conveyed by the first data bus 82 and then by the fourth data bus 102 is written at the address an.

This address is conveyed by the first address bus 81 and then, after passing through the control circuit 5, by the fourth address bus 101 according to the write instruction conveyed by the first control bus 83 and then by the fourth control bus 103. The data element data an thus remains, for a while, directly available in the first SFR registers.

A write operation using the central processing unit 2 would follow precisely the same steps. The first address bus 81, data bus 82 and control bus 83, as well as the switch-over signal 120 are respectively replaced by the second address bus 71, the second data bus 72, the second control bus 73 and the second switch-over signal 130.

The battery of SFR registers 3 typically includes 256 registers. In a preferred example, the 240 first SFR registers are effectively used for the management of the peripherals of the microcontroller. We have seen the basic role of the registers 241 and 242 for access to the hidden supplementary registers. There therefore remain fourteen initially vacant SFR registers.

Figure 2:
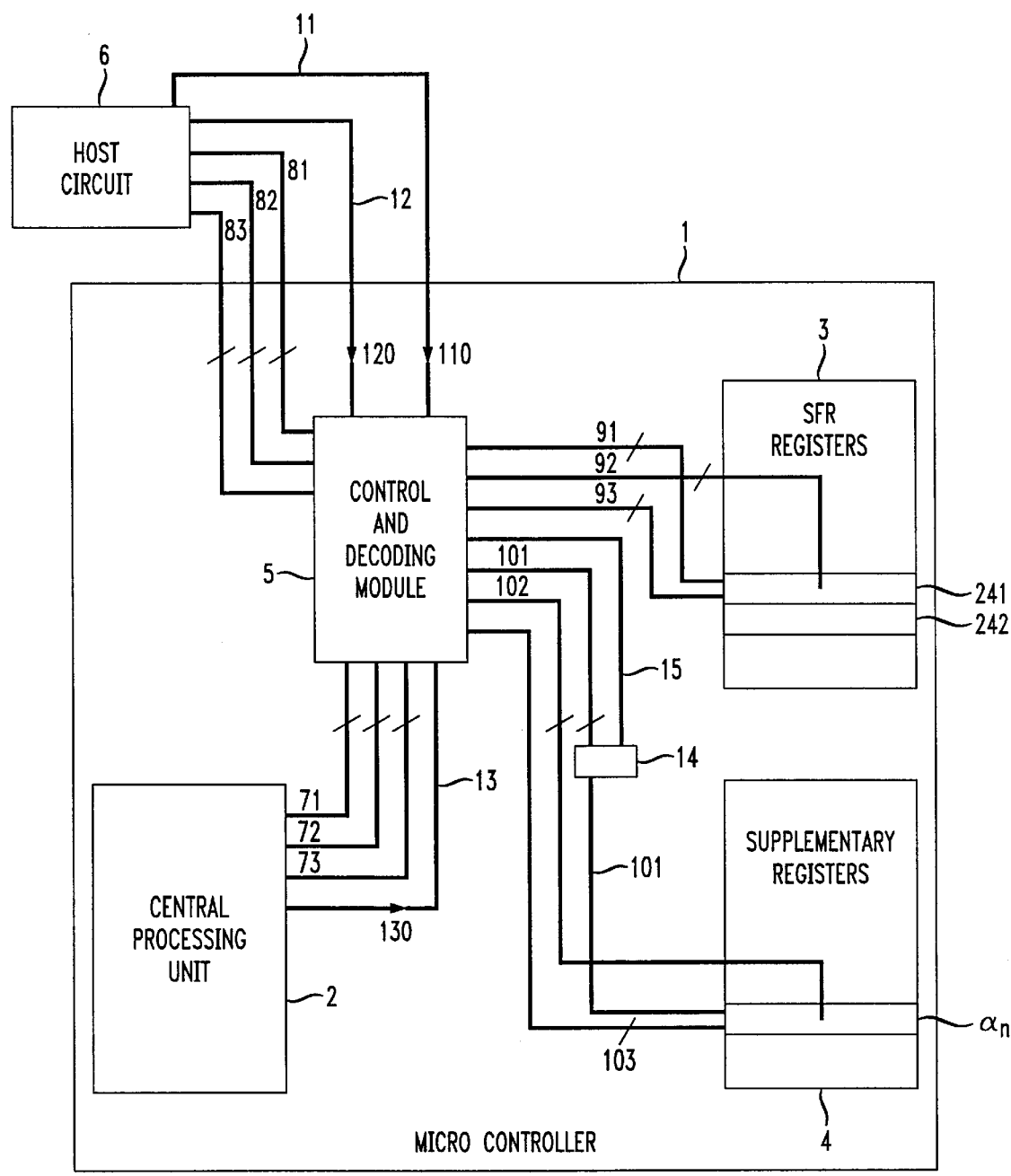
FIG. 2 shows an improvement in the operating of the peripheral control registers in accordance with the invention.

FIG. 2 proposes an improvement that makes it possible to optimize the use of the first SFR registers. The elements presented above in the description relating to FIG. 1 can be seen again in this figure. A decoding and counting circuit 14 is used to count the number of times that each address of the supplementary battery of hidden registers is acted upon. A link 15 coming from this counting circuit 14 is connected to the control and decoding module 5. This module copies the contents of the hidden supplementary registers that are most frequently acted upon in the SFR registers that are initially vacant.

That which is claimed is:

1. A microcontroller comprising:

a central processing unit;

a plurality of peripheral control registers operatively connected to said central processing unit and limited in number because of available addresses, the peripheral control registers comprising first and second peripheral control registers; and a plurality of hidden supplementary registers being accessible by the first and second peripheral control registers;

said first peripheral control register for indirect addressing of a corresponding address of at least one hidden supplementary register, said second peripheral control register for indirect addressing of at least one data element to be written into at least one hidden supplementary register.

2. A microcontroller according to claim 1, wherein said plurality of hidden additional registers are for emulation.

3. A microcontroller according to claim 1, further comprising a control circuit enabling access to the plurality of hidden supplementary registers.

4. A microcontroller according to claim 3, further comprising:

first address, data and control buses connecting said control circuit to said plurality of peripheral control registers; and second address, data and control buses connected said control circuit to said plurality of hidden supplementary registers.

5. A microcontroller according to claim 3, further comprising third address, data, and control buses for connecting said control circuit to an external host circuit.

6. A microcontroller according to claim 5, wherein said control circuit enables access to the hidden supplementary registers from the external host circuit responsive to a first switch-over signal.

7. A microcontroller according to claim 6, wherein said control circuit gives signals from the external host circuit priority of access to the hidden supplementary registers responsive to a priority signal from the external host circuit.

8. A microcontroller according to claim 3, further comprising fourth address, data, and control buses for connecting said control circuit to said central processing unit.

9. A microcontroller according to claim 8, wherein said control circuit enables access to the plurality of hidden supplementary registers by the central processing unit responsive to a second switch-over signal.

10. A microcontroller according to claim 1, wherein said plurality of peripheral control registers further comprises a first group of registers used for managing peripherals of the microcontroller.

11. A microcontroller according to claim 10, wherein said plurality of peripheral control registers further comprises a second group of initially vacant registers.

12. A microcontroller according to claim 11, further comprising a counting and decoding circuit for determining which hidden supplementary registers are more frequently used and for copying into the initially vacant peripheral control registers data elements contained in the more frequently used hidden supplementary registers.

13. A microcontroller comprising:

a plurality of peripheral control registers comprising first and second peripheral control registers; and a plurality of hidden supplementary registers being accessible by the first and second peripheral control registers, said plurality of hidden additional registers for use in emulation;

said first peripheral control register for indirect addressing of a corresponding address of at least one hidden supplementary register, said second peripheral control register for indirect addressing of at least one data element to be written into at least one hidden supplementary register.

14. A microcontroller according to claim 13, further comprising a control circuit enabling access to the plurality of hidden supplementary registers.

15. A microcontroller according to claim 14, wherein said control circuit enables access to the hidden supplementary registers from an external host circuit responsive to a first switch-over signal.

16. A microcontroller according to claim 15, wherein said control circuit gives signals from the external host circuit priority of access to the hidden supplementary registers responsive to a priority signal from the external host circuit.

17. A microcontroller according to claim 14, further comprising a central processing unit; and wherein said control circuit enables access to the plurality of hidden supplementary registers by the central processing unit responsive to a second switch-over signal.

18. A microcontroller according to claim 13, wherein said plurality of peripheral control registers further comprises a first group of registers used for managing peripherals of the microcontroller, and a second group of initially vacant registers.

19. A microcontroller according to claim 18, further comprising a counting circuit for determining which hidden supplementary registers are more frequently used and for copying into the initially vacant peripheral control registers data elements contained in the more frequently used hidden supplementary registers.

20. A microcontroller comprising:
   a central processing unit;
   a plurality of peripheral control registers operatively connected to said central processing unit, the peripheral control registers comprising first and second peripheral control registers;
   a plurality of hidden supplementary registers being accessible by the first and second peripheral control registers, the plurality of hidden additional registers for emulation;
   said first peripheral control register for indirect addressing of a corresponding address of at least one hidden supplementary register, said second peripheral control register for indirect addressing of at least one data element to be written into at least one hidden supplementary register; and
   a control circuit enabling access to the plurality of hidden supplementary registers.

21. A microcontroller according to claim 20, wherein said control circuit enables access to the hidden supplementary registers from an external host circuit responsive to a first switch-over signal.

22. A microcontroller according to claim 21, wherein said control circuit gives signals from the external host circuit priority of access to the hidden supplementary registers responsive to a priority signal from the external host circuit.

23. A microcontroller according to claim 20, wherein said control and decoding circuit enables access to the plurality of hidden supplementary registers by the central processing unit responsive to a second switch-over signal.

24. A microcontroller according to claim 20, wherein said plurality of peripheral control registers further comprises a first group of registers used for managing peripherals of the microcontroller, and a second group of initially vacant registers.

25. A microcontroller according to claim 24, further comprising a counting and decoding circuit for determining which hidden supplementary registers are more frequently used and for copying into the initially vacant peripheral control registers data elements contained in the more frequently used hidden supplementary registers.

26. A method for accessing hidden supplementary registers in a microcontroller further comprising a central processing unit and a plurality of peripheral control registers limited in number because of available addresses, the peripheral control registers comprising first and second peripheral control registers, the method comprising the steps of:
   using the first peripheral control register for indirect addressing of a corresponding address of at least one hidden supplementary register; and
   using the second peripheral control register for indirect addressing of at least one data element to be written into at least one hidden supplementary register.

27. A method according to claim 26, further comprising the step of using the plurality of hidden additional registers for emulation.

28. A method according to claim 26, wherein the microcontroller further comprises a control circuit; and further comprising the step of using the control circuit to enable access to the plurality of hidden supplementary registers from an external host circuit responsive to a first switch-over signal.

29. A method according to claim 26, wherein the microcontroller further comprises a control circuit; and further comprising the step of using the control circuit to enable access to the plurality of hidden supplementary registers from the central processing unit responsive to a second switch-over signal.

30. A method according to claim 26, wherein the plurality of peripheral control registers further comprises a first group of registers used for managing peripherals of the microcontroller, and a second group of initially vacant registers, and further comprising the steps of:
   determining which hidden supplementary registers are more frequently used; and
   copying into the initially vacant peripheral control registers data elements contained in the more frequently used hidden supplementary registers.

* * * * *

UNITED STATES PATENT AND TRADEMARK OFFICE
CERTIFICATE OF CORRECTION

PATENT NO. : 6,223,241 B1
DATED : April 24, 2001
INVENTOR(S) : Gregory Poivre, Jean-Hugues Bosset It is certified that error appears in the above-identified patent and that said Letters Patent is hereby corrected as shown below:

Column 2,
Line 55, delete "mode;" insert -- mode, --

Column 3,
Line 16, delete "aid" insert -- and --

Column 4,
Line 2, delete "an" insert -- αn --
Line 5, delete "an" insert -- αn --
Line 6, delete "an" insert -- αn --
Line 8, delete "an" insert -- αn --
Line 32, delete "an" insert -- αn --
Line 36, delete "an" insert -- αn --
Line 38, delete "an" insert -- αn --
Line 45, delete "an" insert -- αn --
Line 52, delete "an" insert -- αn --
Line 52, delete "an" insert -- αn --
Line 56, delete "an" insert -- αn --
Line 63, delete "an" insert -- αn --

Column 5,
Line 10, delete "an" insert -- αn --
Line 12, delete "an" insert -- αn --
Line 19, delete "an" insert -- αn --
Line 20, delete "an" insert -- αn --
Line 20, delete "SRF" insert -- SFR --
Line 23, delete "an" insert -- αn --
Line 25, delete "an" insert -- αn --

UNITED STATES PATENT AND TRADEMARK OFFICE
CERTIFICATE OF CORRECTION

PATENT NO. : 6,223,241 B1
DATED : April 24, 2001
INVENTOR(S) : Gregory Poivre, Jean-Hugues Bosset It is certified that error appears in the above-identified patent and that said Letters Patent is hereby corrected as shown below:

<u>Column 5,</u>
Line 30, delete "an" insert -- on --
Line 44, delete "There therefore" insert -- Therefore, there --

Signed and Sealed this

Sixth Day of November, 2001

Attest:

*Attesting Officer*

NICHOLAS P. GODICI
*Acting Director of the United States Patent and Trademark Office*